Oct. 31, 1961  P. W. HAAIJMAN ET AL  3,006,783
METHOD OF APPLYING LIGHT-DIFFUSING LAYERS TO
GLASS SURFACES AND GLASS OBJECTS
Filed Dec. 6, 1956
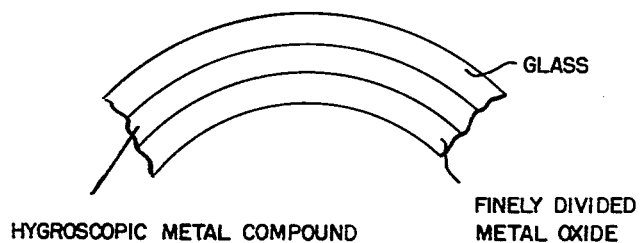
HYGROSCOPIC METAL COMPOUND    FINELY DIVIDED METAL OXIDE
INVENTORS
PIETER WILLEM HAAIJMAN
GERARDUS HENDRICUS JANSSEN
PETRUS CORNELIS VAN DER LINDEN
BY
AGENT

3,006,783
METHOD OF APPLYING LIGHT-DIFFUSING LAYERS TO GLASS SURFACES AND GLASS OBJECTS
Pieter Willem Haaijman, Gerardus Hendricus Janssen, and Petrus Cornelis van der Linden, all of Eindhoven, Netherlands, assignors, by mesne assignments, to North American Philips Company, Inc., New York, N.Y., a corporation of Delaware
Filed Dec. 6, 1956, Ser. No. 626,716
Claims priority, application Netherlands Dec. 8, 1955
7 Claims. (Cl. 117—54)

The invention relates to a method by which glass surfaces are provided with light-diffusing layers, such for example as used on the inner wall of electric incandescent lamps in order to suppress the troublesome shining through of the filament.

It has been suggested to this end to burn metals, the oxides of which have a strong light-diffusing effect in addition to a small light absorption and to precipitate the metal oxide smoke produced on a glass surface. Apart from magnesium use may be made to this end of alloys having a high magnesium content, for example, 90 Mg–10 Al, 95 Mg–5 Si and the like.

Deposits of such metal oxide smoke adhere, in general, little to glass. By previously etching the glass a certain improvement of the adhesion is obtained.

According to prior suggestions a materially improved adhesion of these deposits is obtained by treating the glass previously with gaseous oxidation products of sulphur, phosphorus or with a gaseous hydrochloric acid.

The invention relates to a method of applying a light-diffusing layer to a glass surface by burning metals, more particularly, magnesium or magnesium alloys, the smoke produced settling down on the glass surface as a finely divided metal oxide and is characterized in that prior to the settling of the oxide on the surface a hygroscopic metal compound is applied with the aid of a solution or by evaporation.

Thus a very satisfactory adhesion of the metal oxide smoke to the glass surface is obtained, this adhesion being maintained, even if for example a bulb of an incandescent lamp is internally treated in this manner and then worked up to obtain an incandescent lamp.

A hygroscopic metal compound is to be understood to mean herein a metal compound which becomes liquid in air with a relative humidity of not more than 80% at room temperature.

Examples of such substances are LiOH, $K_2CO_3$ and various halides, for example, LiCl, NaCl, $ZnCl_2$, $MgCl_2$, $CaCl_2$. Simply by applying a solution of these substances to the glass surface they can be provided thereon. The strength of the solution is substantially immaterial for the adhesion. Solutions with a content of a few percent, for example 5%, up to saturation may be used, since a thin film of the hygroscopic compound provides the desired improved adhesion.

A few of the aforesaid hygroscopic substances, for example, LiCl and $ZnCl_2$, are sufficiently volatile to be applied as such by evaporation, while others, for example LiOH and $K_2CO_3$, are decomposed upon evaporation, deposits of alkaline oxides being formed.

The invention has the advantage that it is more simple to work with solutions than with vapours of hydrochloric acid and of oxidation products of sulphur and phosphorus. The invention distinguishes, furthermore, favourably from the known method, since the vapours of hydrochloric acid and of oxides of sulphur and phosphorus are much more corrosive than the metal compounds used in accordance with the invention.

The glass surfaces to be treated in accordance with the invention are preferably rendered light-diffusing by etching. In this manner an appreciable light diffusion substantially without increase in light absorption is obtained already by etching. Therefore, in this case a thinner metal oxide layer, which absorbs consequently less light, many suffice.

The metal oxide is applied to the glass surface by burning the metal at a short distance from the surface. The combustion may be initiated by introducing the metal in a container of high-melting point metal, for example, tungsten, which is heated by current. As an alternative, high-frequency heating may be employed to this end; in this case the metal to be burned may be kept in a quartz container. The thickness of the light-diffusing layer may be controlled by the choice of the quantity of metal and of the distance of the area where it is burned from the glass surface.

In the following table a number of examples is given for solutions that may be used to improve the adhesion of the light-diffusing metal oxide layer in incandescent lamps. All layers are used in incandescent lamps of 60 w. The bulbs were frosted internally by etching and washed. Then one of the solutions was poured into the bulb and after the liquid had been poured out, the bulb was dried in air, so that a thin film of the hydroscopic substance remained.

Then 150 mgs. of magnesium was burned in the bulbs of 60 mms. in diameter, supplementary air being introduced.

The number of lumen per watt and the lifetime in hours of the incandescent lamps provided in the said manner with a light-diffusing layer are indicated, in the table. For comparison these values are also given for similar incandescent lamps, of which the bulbs were frosted only by etching and for lamps, of which the etched bulbs were provided with a light-diffusing $SiO_2$-layer, obtained by burning ethyl silicate.

The thickness of the $SiO_2$-layer, as well as that of the MgO-layers is chosen to be such that shining through of the filament is just avoided.

| Adhesive | Lm./w. | Lifetime |
| --- | --- | --- |
| 10% LiOH-solution | 11.0 | 1,200 |
| 5% $ZnCl_2$-solution | 10.0 | 1,240 |
| saturated NaCl-solution | 9.85 | 1,480 |
| 5% $MgCl_2$-solution | 10.25 | 1,180 |
| 3% $CaCl_2$-solution | 10.30 | 1,380 |
| $SiO_2$-layer | 10.0 | 1,040 |
| etched bulb | 11.25 | 1,105 |

From a comparison of the value of lm./w. of the incandescent lamps with a light diffusing layer according to the invention with those of lamps having a light-diffusing layer obtained by burning ethyl silicate and of lamps, of which the bulbs are only etched, it is evident that the light absorption of the lamps according to the invention is low and, generally, lower than that of the lamps with the $SiC_2$-layer. It is furthermore evident that the lifetime of the incandescent lamps according to the invention is the most favourable.

What is claimed is:

1. In the method of covering a glass surface with a light-diffusing layer obtained by combustion of a metal which settles as smoke on the glass surface, the step of first applying to the glass surface a coating consisting of a hygroscopic metal compound which improves adhesion of the light-diffusing layer to the glass.

2. A method as claimed in claim 1 in which the metal is selected from the group consisting of magnesium and alloys thereof.

3. A method as claimed in claim 2 in which the glass surface is covered with a solution of a hygroscopic metal compound.

4. A method as claimed in claim 2 in which the glass surface is covered by evaporation of a hygroscopic metal compound.

5. A method as claimed in claim 2 in which the hygroscopic metal compound is a lithium compound.

6. A method as claimed in claim 2 in which the hygroscopic metal compound is a metal halide.

7. A method as claimed in claim 2 in which the glass surface is etched prior to covering the same with the hygroscopic metal compound.

References Cited in the file of this patent

UNITED STATES PATENTS

| | | |
|---|---|---|
| 1,574,862 | Benson | Mar. 2, 1926 |
| 2,111,576 | Stewart | Mar. 22, 1939 |
| 2,219,899 | Jenkins | Oct. 29, 1940 |
| 2,451,590 | Tidik et al. | Oct. 19, 1948 |
| 2,684,918 | Oughton | July 27, 1954 |
| 2,727,830 | Janssen et al. | Dec. 20, 1955 |